US006321162B1

(12) United States Patent
Hessing

(10) Patent No.: US 6,321,162 B1
(45) Date of Patent: Nov. 20, 2001

(54) METHOD FOR TAKING INTO ACCOUNT SUPPLEMENTARY TRAFFIC INFORMATION IN AN ONBOARD TRAVEL CONTROL SYSTEM

(75) Inventor: Bernd Hessing, Holle (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/530,155

(22) PCT Filed: Oct. 22, 1998

(86) PCT No.: PCT/DE98/03098

§ 371 Date: Jun. 29, 2000

§ 102(e) Date: Jun. 29, 2000

(87) PCT Pub. No.: WO99/22354

PCT Pub. Date: May 6, 1999

(30) Foreign Application Priority Data

Oct. 25, 1997 (DE) ..... 197 47 230

(51) Int. Cl.[7] ..... G08G 1/123; H04Q 7/00

(52) U.S. Cl. ..... 701/210; 340/990; 340/991; 340/988; 455/53.1; 342/457; 179/82; 343/8

(58) Field of Search ..... 701/210, 201, 701/202, 209, 211, 213; 340/995, 905; 342/457

(56) References Cited

U.S. PATENT DOCUMENTS

| | | | | |
|---|---|---|---|---|
| 4,954,958 | | 9/1990 | Savage et al. | 701/202 |
| 5,187,810 | * | 2/1993 | Yoneyama et al. | 455/34.1 |
| 5,208,756 | * | 5/1993 | Song | 364/449 |
| 5,508,917 | | 4/1996 | Siegle et al. | 701/207 |
| 5,543,789 | * | 8/1996 | Behr et al. | 340/995 |
| 5,689,252 | * | 11/1997 | Ayanoglu et al. | 340/991 |
| 5,760,742 | * | 6/1998 | Branch et al. | 342/457 |
| 5,845,227 | * | 12/1998 | Peterson | 701/209 |
| 5,862,509 | * | 1/1999 | Desai et al. | 701/209 |
| 5,900,825 | * | 5/1999 | Pressel et al. | 340/905 |
| 5,933,100 | * | 8/1999 | Golding | 340/995 |
| 5,950,161 | * | 9/1999 | Kozuma et al. | 704/260 |
| 6,088,652 | * | 7/2000 | Abe | 701/208 |

FOREIGN PATENT DOCUMENTS

| | | |
|---|---|---|
| 42 26 230 | 2/1993 | (DE) . |
| 0 379 198 | 7/1990 | (EP) . |
| 0 564 353 | 10/1993 | (EP) . |
| WO 97 24431 | 7/1997 | (WO) . |

* cited by examiner

*Primary Examiner*—William A. Cuchlinski, Jr.
*Assistant Examiner*—Tuan C To
(74) *Attorney, Agent, or Firm*—Kenyon & Kenyon

(57) ABSTRACT

A method for taking into account supplementary traffic information for operating an onboard travel control system of a motor vehicle, containing an internal digital road map, by transferring a point of origin and destination to a central computer and transmitting, to the onboard travel control system of the motor vehicle, a route plan drawn up in the central computer, taking into account the supplementary traffic information is achieved, at low data transmission rates and maintaining short transmission times, by providing the internal digital road map of the onboard travel control system with information about location codes; by transmitting the route plan by specifying route segments that are defined by the location codes and lie between the point of origin and the destination; and by modifying the transmitted route segments in the internal digital road map of the travel control system so that they are taken into account as a higher priority than non-transmitted route segments during the subsequent route selection carried out in the onboard travel control system.

24 Claims, 2 Drawing Sheets

METHOD FOR TAKING INTO ACCOUNT SUPPLEMENTARY TRAFFIC INFORMATION IN AN ONBOARD TRAVEL CONTROL SYSTEM

FIELD OF THE INVENTION

The present invention relates to a method for taking into account supplementary traffic information for operating an onboard travel control system of a motor vehicle, including an internal digital road map, by transferring a point of origin and destination to a central computer and transmitting, to the onboard travel control system of the motor vehicle, a route plan drawn up in the central computer, taking into account the supplementary traffic information.

BACKGROUND OF THE INVENTION

Conventional onboard travel control systems have been in use for a number of years, at least in high-end vehicles. The travel control systems include a navigation system to enable the vehicle's present position to be determined. For this purpose, satellite navigation is generally combined with an evaluation by vehicle sensors. Travel control systems further include at least one digital road map that is part of the travel control system, for example in the form of a CD-ROM. The onboard travel control systems operate autonomously, but are not able to take into account up-to-date traffic information.

A method for transmitting traffic information in a standardized protocol is known from Preliminary European Standard ENV12313-1. This method uses location codes that can be used to identify all of a country's traffic-related nodes that are listed in a location table. In addition to location coding, the protocol also codes the direction and extent of the route, thereby making it possible to define the territory described by the traffic disturbance. The traffic information is transmitted in the radio data system (RDS) along with a radio broadcast and can be stored, decoded, and output in a suitable form as a traffic message channel (TMC) in the receiver. To enable the travel control system to take the traffic information into account, the digital maps used in the travel control system are provided with the information in the location table, thereby determining whether an up-to-date item of traffic information affects the pre-calculated route in the case in hand. The onboard travel control system is able to automatically use the traffic information only to a limited extent, due to the considerable cost that this involves. The system does not take into account traffic forecasts and can take into account only events limited to the TMC locations for route planning purposes.

Attempts have therefore been made to use a central computer for performing a route calculation that takes into account the up-to-date traffic information and to supply the route calculation as a service, for examples in a mobile radio system. For this purpose, the onboard travel control system must be provided with a remote data transmission system. To interpret the centrally calculated, optimized route in the vehicle itself, the central office must use an easy-to-understand digital map. According to a method of this type used by Mercedes Benz in Tokyo, the route is transmitted by arranging the route components to be traveled in sequential order. The identifiers for the route components are then transmitted in a code that can be used only in Tokyo. This has a particular disadvantage in that, with complex routes, the transmission capacity required increases in more or less linear proportion to the length of the route. The transmission capacity requires the use of expensive point-to-point data connections, with the transmission of a route for a trip within the city of Tokyo requiring transmission times of at least 45 seconds. Data transmissions of such a duration cannot be reliably ensured while driving a vehicle.

SUMMARY OF THE INVENTION

An object of the present invention is to simplify the transmission of a centrally calculated route plan to an onboard travel control system and to carry out this transmission within a shorter period of time.

To achieve the object, a method is provided. in that, according to the present invention in which, the internal digital road map of the travel control system is provided with information about location codes; the route plan is transmitted by specifying route segments that are defined by the location codes and lie between the point of origin and destination; and the transmitted route segments are modified in the internal digital road map of the travel control system so that they are taken into account as a higher priority than other non-transmitted route segments during the subsequent route selection carried out in the onboard travel control system.

According to the present invention, the optimized route determined in the central computer is transmitted by transmitting route segments that are loaded to the onboard travel control system in a location-encoded format. To do this, the onboard travel control system has information about the location codes used by providing the internal digital road map in advance with information about the location codes used. The transmitted route segments are used to modify the internal digital road map-possibly after converting the transmitted location codes to the location codes used in the internal digital map via tables or algorithms-by using them as high-priority route segments for operating the onboard travel control system. The high priority can be identified, for example, by assigning a very high valid average speed. The transmitted route segments can follow each other seamlessly, although this is not necessary clearly define the overall route. Any gaps between the route segments are filled in by the onboard travel control system. Likewise, the onboard travel control system determines the path from the point of origin to the entry point at the first route segment to be traveled and output the correct directions. A similar procedure applies when leaving the last selected route segment to reach the specific destination. Consequently, the onboard travel control system fills in any gaps between the transmitted route segments and performs a separate navigation operation, independently of the central computer, at the point of origin and for the destination if the point of origin and/or the destination do not happen to match a location contained in the location table. In addition to the advantage that the optimum, calculated route does not have to be transmitted in its entirety for the method according to the present invention to work, there is also the advantage that only the street segments for which traffic information is available in tables (such as the TMC location table) need to be defined and synchronized between the central office and the onboard travel control system.

Upon receipt of TMC-encoded traffic disturbances, the stored, preferred route can be checked. If a traffic disturbance is located in a preferred route segment, the modification of the route segment affected can be altered to cancel its priority and take the traffic disturbance into account. The priority can be canceled locally, if necessary, without losing the rest of the preferred route in the onboard travel control system, eliminating the need to recalculate the route in the central office at additional expense.

In one preferred embodiment of the method according to the present invention, the route segment codes are composed of a code for a specific position on a specific street, a code for the direction on the street, and a code for the extent of the route segment on the street. This code structure matches the location code provided for the traffic information encoded for RDS transmission. However, it is also possible to encode a route segment according to a different structure, for example, by specifying a street and the geographical coordinates for the entry point and exit point of a transmitted route segment.

Because of the much smaller data volume afforded by the method according to the present invention, the route segments determined by the central computer can be economically transmitted in a system for sending short messages, e.g., in the form of SMS (short message system) signals. This eliminates the need to set up expensive point-to-point connections. When transmitting the route segments with SMS signals, it does not matter if not all route segments to be transmitted fit into a single SMS signal, since multiple SMS signals can be easily used for transmitting the route segments.

The use of a powerful central computer has an advantage in that it is to draw up an individual, optimized route plan, taking into account all available, up-to-date traffic information, including any traffic information that was forecast for the course of the route. According to the present invention, this route plan is loaded to the onboard travel control system by transmitting route segments. Compared to the specification of destination points that must absolutely be traveled, loading the route segments has the advantage that the vehicle does not have to pass through fictitious intermediate destination points, since the onboard travel control system can respond flexibly to any deviations, using the internal digital road map that was modified by the transmitted route segments of the central computer.

BRIEF DESCRIPTION OF THE DRAWINGS

A The present invention is explained in greater detail below on the basis of one embodiment illustrated in the drawing, where.

DETAILED DESCRIPTION

Figure 1:
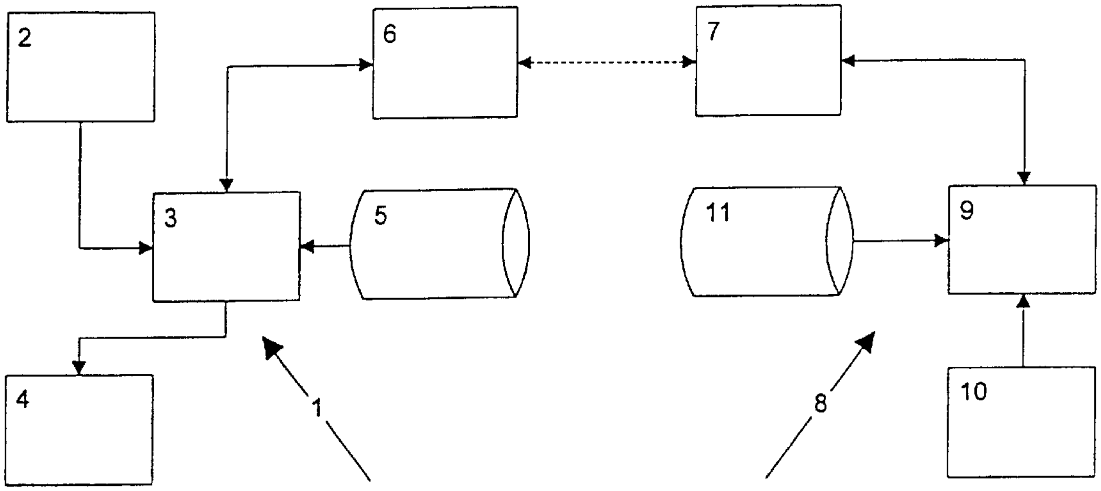
FIG. 1 shows schematic function blocks of an onboard travel control system that communicates with a central computer by remote data transmission according to the present invention.

FIG. 1 shows function blocks of an onboard travel control system 1 into which a destination can be entered via an input device 2. With the help of an automatic positioning system, a route computer 3 calculates the present position for the entered destination and, with the help of a digital map linked to route computer 3, calculates a route that is communicated to the driver along with recommended driving directions via an output device 4.

A TMC block 5 shows that the digital map used in the route computer is provided with a TMC location table that can be used to encode (16 bits) and clearly identify all important traffic nodes.

The destination entered via input device 2 and possibly a point of origin also entered via input device 2 or a point of origin determined by the automatic positioning system in route computer 2 are gent to a remote data transmission interface 6 together with a request for an optimized route calculation. Via remote data transmission interface 6, onboard travel control system 1 communicates with a remote data transmission interface 7 of a central office 8 in which a central computer 9 calculates a travel route based on the received request to calculate a route between a specific point of origin and an entered destination. When central computer 9 calculates the travel route, the up-to-date traffic information stored in a modification stage 10 is used to modify the digital road map used in central computer 9. Powerful central computer 9 can take into account in this manner all traffic information related to the possible travel routes, making it possible to calculate an optimized travel route that has been adjusted to the present traffic situation.

The optimized travel route is transmitted from central computer 9 to onboard travel control system 1 via remote data transmission interfaces 7, 6. This is done, according to the present invention, by transmitting all route segments along which the vehicle must travel between the point of origin and the destination. These route segments are identified, according to the present invention, by location codes for which is preferably used a TMC location table 11 that corresponds to TMC location table 5 of onboard travel control system 1. The route segments are therefore preferably defined by location codes from location table 11 (16 bits), a direction indication for the direction of travel on the street (1 bit), and the extent of the area on the street (3 bits). If the area through which the vehicle is to travel is too large to be transmitted by the three extent bits, the area is divided up and transmitted in the form of multiple route segments.

Figure 2:
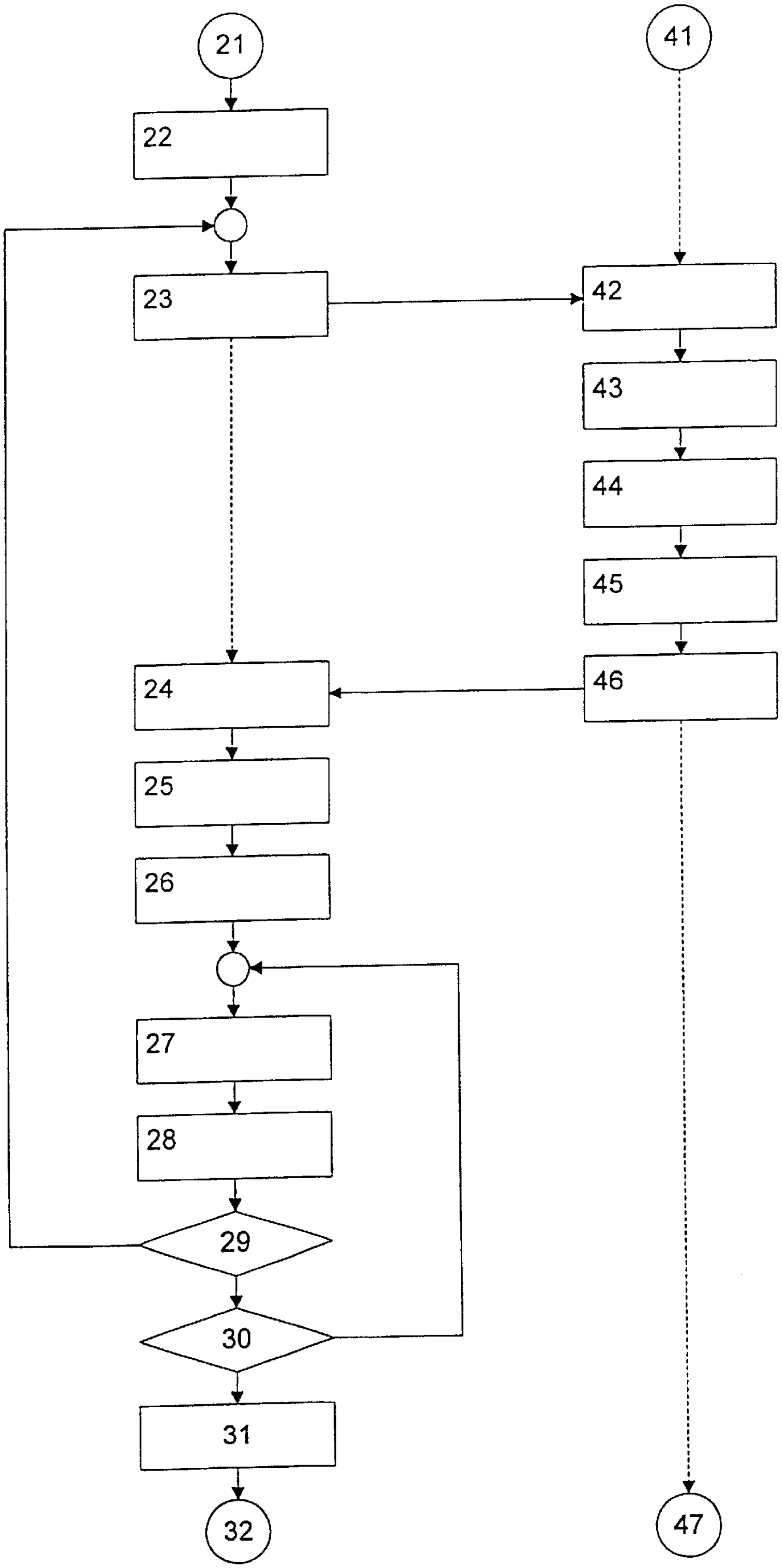
FIG. 2 shows a functional flowchart according to the present invention for the arrangement illustrated in FIG. 1.

The transmitted route segments are used to modify the digital map in route computer 3 of onboard travel control system 1, as explained by the functional flowchart illustrated in FIG. 2.

A start 21 of the onboard travel control system enables an input 22 for a destination. In a transfer step 23, the entered destination and the automatically detected position of the motor vehicle are transferred to remote data transmission interface 6. Onboard travel control system 1 then remains in a waiting state until reaching a receive step 24.

A start step 41 for central office 8 places the latter in a waiting state for a request 23 from an onboard travel control system 1, which is received by remote data transmission interface 7 in a receive step 42. An optimum, individual route 44 is calculated on the basis of mathematical traffic models 43 that take into account the up-to-date traffic information. This route is divided into route segments in an encoding step 45 and is characterized by a TMC location code. The encoded route segments are transmitted in a transmission step 46 using remote data transmission and are received by onboard travel control system 1 in receive step 24. After transmission step 46, central office 8 has completed its function, which means that this request has reached end 47 of the central office function.

The internal digital map of route computer 3 is modified in step 25 on the basis of the route segments received in step 24. The route segments transmitted from central office 8 are modified in the internal digital map so that they can be used by route computer 3 as a high priority during subsequent, independent route calculation 26. This yields a route that initially contains the route segments provided by central office 8, to which are added, by the onboard travel control system, point-of-origin and destination navigation information as well as navigation information for closing any connection gaps.

Subsequent automatic positioning and route checking step 27 is used to continuously check the vehicle's own position and any correspondence with the pre-calculated route, and appropriate driving recommendations 28 are output via output device 4, making it possible to take into account new information about traffic disturbances along the route.

A subsequent checking step 29 checks whether a major deviation from the pre-calculated travel route requires the route to be recalculated on the basis of the vehicle's present location. A recalculation may also be necessitated by time influences (breaks, expiration of a specific period of time, exceeding the planned travel time). If so, the function sequence is reset to the moment after destination input 22, and a new route calculation is requested with the aid of central office 8. If a recalculation 29 is not necessary, a test step 30 queries whether the destination has been reached. If not, steps 27 though 29 are repeated until the destination has been reached. Once the destination hag been reached, step 31 cancels the modification to the internal digital road map made for the current travel request (in step 25), restoring onboard travel control system 1 to its original state. This concludes the operation of onboard travel control system 1 for this request, resetting the function sequence to "end" 32.

EXAMPLE

The point of origin of a motor vehicle is the port of Husum. The Bad Segeberg train station is entered as the destination. The location and destination are transferred between interfaces 6,7 in transmission step 23 using remote data transmission and are received by a central office 8 in receive step 42, Central office 8 offers to draw up an individual, optimized travel route as a service and calculates the individual, optimized route. This route is transmitted by transmitting the following route segments:

B 201 from Husum to the Schleswig/Schuby on-ramp. TMC location: 25761; direction: –; extent: 2.

A 7 from Schleswig/Schuby to Bad Bramstedt. TMC location: 12390; direction: –; extent: 14 (transmitted as two segments).

B 206 from Bad Bramstedt to Bad Segeberg. TMC location: 21634; direction: –; extent: 2.

This route is transmitted in an SMS signal as follows:

Bits 1–16: Protocol Discriminator, BulkFlag and MessageType according to prENV/278/4/3/0015.

Bits 17–32: Service ID, CountryCode, and DatabaseID for defining the TMC location table used according to the commonly used TMC method.

Bits 23–52: Partial route from Bad Bramstedt to Bad Segeberg.

Bits 53–72: Partial route from Schleswig/Schuby to Bordesholm.

Bits 72–92: Partial route from Bordesholm to Bad Bramstedt.

Bits 93–112: Partial route from Husum to Schleswig/Schuby.

Bits 113–1120: Not used.

After these route segments have been sent from central office 8 in transmission step 46 and received by onboard travel control system 1 in receive step 24, the period of time for traveling along a transmitted route segment is greatly reduced in modification stage 25 during route selection step 26 of route computer 1. The normal travel control algorithm of route computer 3 is used for the non-transmitted route segments, which are needed to complete the overall route.

What is claimed is:

1. A method for taking into account supplementary traffic information for operating an onboard travel control system of a motor vehicle, the onboard travel control system including an internal digital road map having route segments, comprising the steps of:

transferring a point of origin and a destination from the onboard travel control system to a central computer of a central office, the onboard travel control system having information about location codes;

calculating, via the central computer, a route plan that takes into account the supplementary traffic information, the route plan including route segments that are defined by the location codes, the route segments being disposed between the point of origin and the destination;

transmitting the route plan from the central computer to the onboard travel control system; and modifying, in the internal digital road map, the transmitted route segments so that the transmitted route segments are assigned a higher priority over the route segments in the internal digital road map during subsequent route selection, the subsequent route selection being carried out by the onboard travel control system.

2. The method according to claim 1, wherein the step of calculating includes the step of encoding the route segments, the encoded route segments include a code for a specific position on a specific street, a code for a direction on the street and a code for extent of the route segment on the street.

3. The method according to claim 1, wherein the step of encoding includes the step of encoding using traffic message channel (TMC) location codes.

4. The method according to claim 1, wherein the step of calculating includes the step of encoding the route segments by specifying entry points and by specifying exit points on a street.

5. The method according to claim 1, wherein the step of calculating includes the step of encoding the route segments, and wherein the step of transmitting includes the step of transmitting the encoded route segments via short message system (SMS) transmission.

6. The method according to claim 1, wherein the subsequent route selection being carried out by the onboard travel control system uses both the transmitted route segments as well as the route segments in the internal digital road map during the subsequent route selection.

7. The method according to claim 1, further comprising the step of filling any gaps between the transmitted route segments by the onboard travel control system.

8. The method according to claim 1, wherein:

the route plan is too large, then it is divided up and the transmission is in the form of multiple route segments.

9. A method for taking into account supplementary traffic information for operating an onboard travel control system of a motor vehicle, the onboard travel control system including an internal digital road map having route segments, comprising the steps of:

transferring a point of origin and a destination from the onboard travel control system to a central computer of a central office, the onboard travel control system having information about location codes;

calculating, via the central computer, a route plan that takes into account the supplementary traffic information, the route plan including route segments that are defined by the location codes, the route segments being disposed between the point of origin and the destination;

transmitting the route plan from the central computer to the onboard travel control system;

modifying, in the internal digital road map, the transmitted route segments so that the transmitted route segments are assigned a higher priority over the route segments in the internal digital road map during subsequent route selection, the subsequent route selection being carried out by the onboard travel control system; and further comprising the step of:

if a particular item of information relating to a traffic disturbance for a particular route segment is received by the onboard travel control system, then canceling a modification of a particular route segment by the onboard travel control system.

10. A method for taking into account supplementary traffic information for operating an onboard travel control system of a motor vehicle, the onboard travel control system including an internal digital road map having route segments, comprising the steps of:

transferring a point of origin and a destination from the onboard travel control system to a central computer of a central office, the onboard travel control system having information about location codes;

calculating, via the central computer, a route plan that takes into account the supplementary traffic information, the route plan including route segments that are defined by the location codes, the route segments being disposed between the point of origin and the destination;

transmitting the route plan from the central computer to the onboard travel control system;

modifying, in the internal digital road map, the transmitted route segments so that the transmitted route segments are assigned a higher priority over the route segments in the internal digital road map during subsequent route selection, the subsequent route selection being carried out by the onboard travel control system; and further comprising the step of:

if the destination is reached, then canceling modifications of the transmitted route segments.

11. A method for taking into account supplementary traffic information for operating an onboard travel control system of a motor vehicle, the onboard travel control system including an internal digital road map having route segments, comprising the steps of:

transferring a point of origin and a destination from the onboard travel control system to a central computer of a central office, the onboard travel control system having information about location codes;

calculating, via the central computer, a route plan that takes into account the supplementary traffic information, the route plan including route segments that are defined by the location codes, the route segments being disposed between the point of origin and the destination;

transmitting the route plan from the central computer to the onboard travel control system;

modifying, in the internal digital road map, the transmitted route segments so that the transmitted route segments are assigned a higher priority over the route segments in the internal digital road map during subsequent route selection, the subsequent route selection being carried out by the onboard travel control system; and further comprising the step of:

if at least one of a particular time variation and a particular position variation exceed a particular threshold, then automatically revising the route plan via the central office.

12. The method according to claim 11, further comprising the step of:

if the revised route plan is transmitted from the central office, then canceling modifications to the previously transmitted route segments.

13. A system for operating an onboard travel control device in a motor vehicle, the system comprising:

the onboard travel control device includes an internal digital road map having route segments contained therein;

means for taking into account supplementary traffic information for operating the onboard travel control device in the motor vehicle;

means for transferring a point of origin and a destination from the onboard travel control device to a central computer of a central office, the onboard travel control device having information about location codes;

the central computer calculates a route plan that takes into account the supplementary traffic information, the route plan including route segments that are defined by the location codes, the route segments being disposed between the point of origin and the destination;

means for transmitting the route plan from the central computer to the onboard travel control device; and wherein the internal digital road map is modified based upon the transmitted route segments so that the transmitted route segments are assigned a higher priority over the route segments in the internal digital road map during subsequent route selection, the subsequent route selection being carried out by the onboard travel control device.

14. The system according to claim 13 wherein the route plan has encoded route segments, and wherein the encoded route segments include a code for a specific position on a specific street, a code for a direction on the street and a code for extent of the route segment on the street.

15. The system according to claim 13 wherein the route segments include encoded traffic message channel (TMC) location codes.

16. The system according to claim 13 wherein the route segments include encoded route segments with specified entry points and specified exit points on a street.

17. The system according to claim 13 wherein the route segments are encoded, and transmitted via short message system (SMS) transmission.

18. The system according to claim 13 wherein when a particular item of information relating to a traffic disturbance for a particular route segment is received by the onboard travel control device, the modification of a particular route segment by the onboard travel control system is then cancelled.

19. The system according to claim 13 wherein when the destination is reached the modifications of the transmitted route segments is then cancelled.

20. The system according to claim 13 wherein when at least one of a particular time variation and a particular position variation exceed a particular threshold then the route plan is automatically revised via the central office.

21. The system according to claim 20 wherein when the revised route plan is transmitted from the central office the modifications to the previously transmitted route segments are then cancelled.

22. The system according to claim 13 wherein the subsequent route selection is carried out by the onboard travel control device using both the transmitted route segments as well as the route segments in the internal digital road map during the subsequent route selection.

23. The system according to claim 13 wherein the onboard travel control device has means to fill any gaps between the transmitted route segments and the internal digital road map.

24. The system according to claim 13 wherein, if the route plan is too large, then it is divided up and the transmission is in the form of multiple route segments.

* * * * *